United States Patent [19]

Cotten

[11] 4,175,917
[45] Nov. 27, 1979

[54] APPARATUS FOR FORMING INTEGRAL TUBING AND WASHER

[76] Inventor: Roger C. Cotten, 299 Vincent St., Metairie, La. 70002

[21] Appl. No.: 935,332

[22] Filed: Aug. 21, 1978

Related U.S. Application Data

[62] Division of Ser. No. 881,641, Feb. 27, 1978, Pat. No. 4,140,739.

[51] Int. Cl.² .................. B29C 17/00; B29C 24/00
[52] U.S. Cl. ................................ 425/142; 425/143; 425/163; 425/164; 425/297; 425/392; 425/394
[58] Field of Search ............... 425/135, 143, 162, 163, 425/164, 289, 297, 383, 384, 392, 393, 142, 394; 264/320, 322

[56] References Cited

U.S. PATENT DOCUMENTS

| | | | |
|---|---|---|---|
| 3,089,190 | 5/1963 | Branham | 425/392 |
| 3,496,598 | 2/1970 | Young et al. | 425/163 |
| 3,553,780 | 1/1971 | Kuhlemann | 425/162 |
| 3,773,456 | 11/1973 | Salz et al. | 425/384 |
| 3,920,373 | 11/1975 | Brown | 425/392 |
| 4,005,968 | 2/1977 | Crawford | 425/392 |
| 4,008,028 | 2/1977 | Ronden et al. | 425/393 |
| 4,087,225 | 5/1978 | Wolcott | 425/392 |

Primary Examiner—W. E. Hoag
Attorney, Agent, or Firm—Wofford, Fails & Zobal

[57] ABSTRACT

Apparatus for forming an integrally formed thermoplastic conduit and washer for being connected with a second conduit by way of conventional fitting, characterized by means for of inserting a guide pin within the tubing so as to maintain a predetermined internal diameter within the tubing and washer; emplacing a mold about the guide pin and tubing to hold the tubing, the mold having a washer cavity to define the exterior dimensions and form of the washer with the tubing extending about the guide pins and into the washer cavity; means for heating at least the outer most portion of the wall of the tubing that is within the washer cavity to its softening temperature and means for compressing the softened tubing walls longitudinally of the pin to accordion pleat the walls into a washer having an exterior film therabout and having the accordion pleated walls therewithin to have an inherent springiness that readily effects sealing interconnection with another conduit shape and that frictionally holds a tightened fitting in place.

7 Claims, 12 Drawing Figures

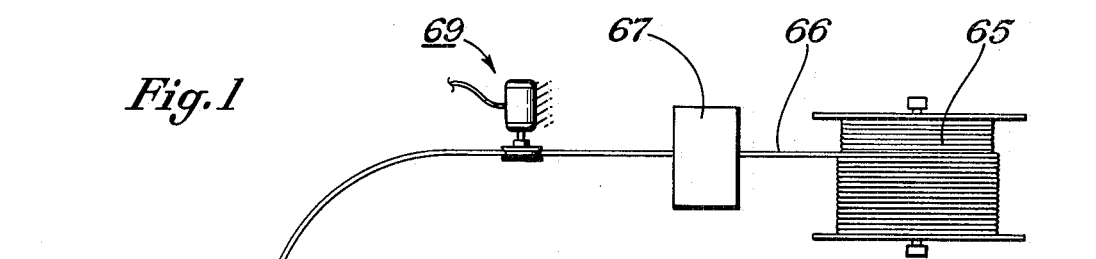
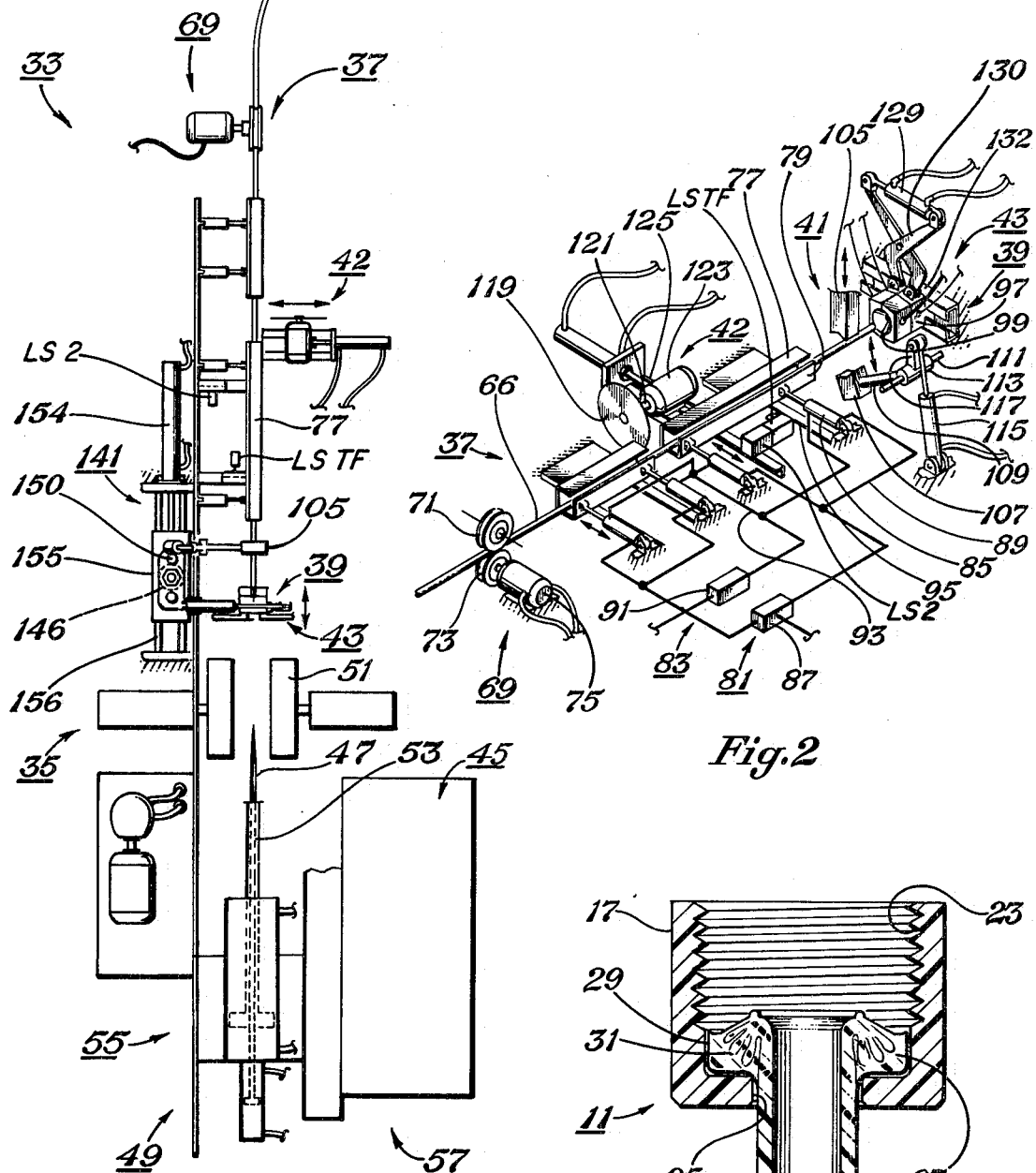
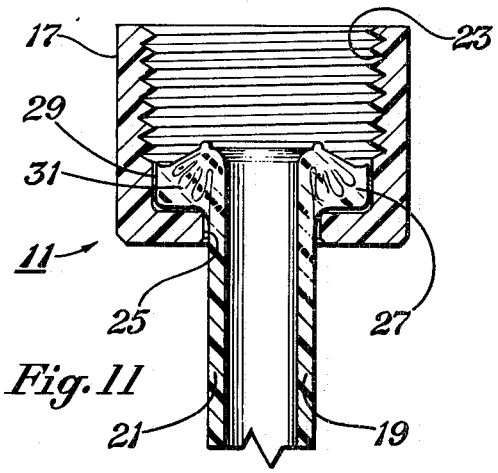

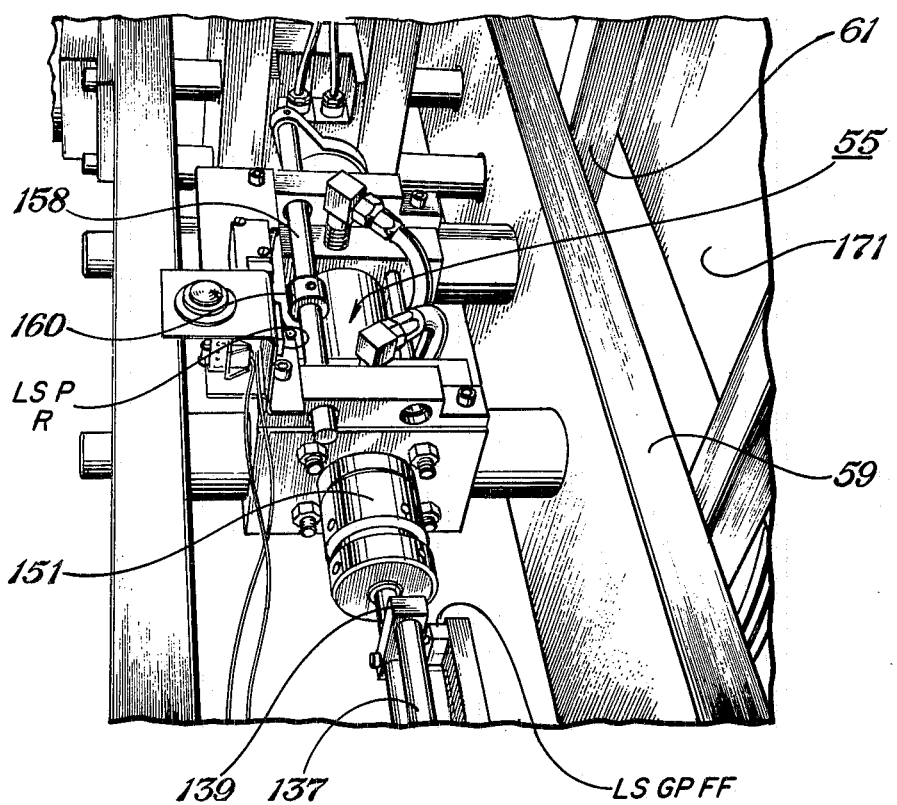
Fig. 7
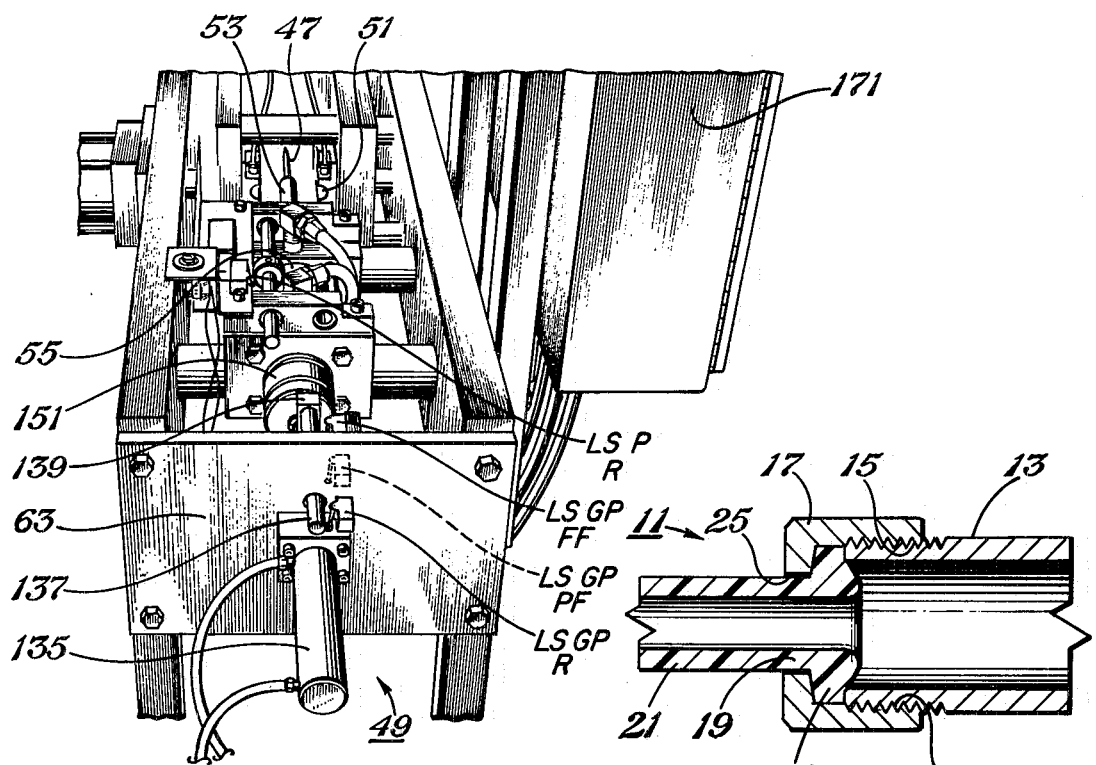
Fig. 8
Fig. 12

APPARATUS FOR FORMING INTEGRAL TUBING AND WASHER

This is a division of application Ser. No. 881,641, filed 2/27/78, now U.S. Pat. No. 4,140,739.

BACKGROUND OF THE INVENTION

1. Field of the Invention

This invention relates generically to joinder of plastic conduit to other conduit. More particularly, this invention relates to method and apparatus for making a combination thermoplastic conduit having integrally formed washer for effecting joinder to other pipe or the like.

2. Description of the Prior Art

The prior art has seen the introduction of a wide variety of types of conduits and methods of joining of the conduits, whether they were of the same or of dissimilar materials. A large improvement in plumbing technology was made when copper pipe began to be employed. The price of copper has risen so dramatically, however, that it is economically infeasible in many applications. Its successor was plastic pipe, or tubing, which had some advantages even over the copper pipe and was more economical. One recent innovation that is seeing increasingly widespread use is the use of plastic conduits, such as polybutylene pipe, or tubing, in low pressure applications.

In my co-pending application "Joinder of Plastic Pipe to Other Pipe", Ser. No. 728,232, filed Sept. 30, 1976, I described the problems that have plagued the industry and delineated therein an improvement and the descriptive matter that application is incorporated herein by reference. Specifically, one of the problems was the joinder of the plastic pipe to other types of conduit, such as wrought iron pipe, frequently employed in home construction. One of the advantages of the plastic pipe is that it does not set up galvanic cells as did the copper tubing. The prior art has seen different approaches ranging from the use ferrule fittings to the use of preformed ends to be joined with the plastic pipe, such as described in U.S. Pat. No. 3,831,983, the closest art of which I am aware. In that patent, the preformed end is fused into the end of the plastic conduit and thereafter forced interiorly of and in swaging relationship with carefully preformed shoulders to form a seal. While that method had advantages over the art theretofore, it was relatively expensive since the fittings had to be so carefully prepared. Also, application in the field required stocking a relatively complete range of sizes that had been carefully prepared at the factory. In my own co-pending application, I described the forming of an integral washer onto the plastic tubing, as by inserting the end onto a flat plate or within a mold and allowing the plastic, such as polybutylene, to melt and roll back in upon and cohere to itself to form the washer. That innovation has been extremely useful and successful, but the washer did not have enough inherent resiliency to hold a fitting tightened into place with total success in preventing loosening of the fitting; and did not alleviate the problem of breaking adjacent a heating line.

Also the washer did not have adequate resiliency to insure sealing all of the time regardless of the roughness of the fitting against which it was seated. Moreover, the forming of the washer was done in the field by a plumber on an individual basis, so it was time consuming, slow, and expensive.

Thus it can be seen the prior art has not been totally successful in providing an inexpensive method and apparatus for effecting joinder of plastic pipe to other conduit while retaining sealing and tightened fittings and otherwise obviating the disadvantages of the prior art structures.

SUMMARY OF THE INVENTION

Accordingly, it is an object of this invention to provide an inexpensive method and apparatus for forming an integral plastic conduit and washer for joining to other conduit while sealing against fluid leakage, retaining a tightened frictional fitting in place, reinforcing the tubing wall adjacent a heating line and otherwise obviating disadvantages of the prior art structures.

It is a specific object of this invention to provide apparatus for forming the plastic conduit and washer for being joined to a second conduit and, specifically, to provide apparatus for automated production of the combination of plastic conduit and washer for mass production of predetermined lengths and types of hoses and the like.

These and other objects will become apparent from the descriptive matter hereinafter, particularly when taken in conjunction with the appended drawings.

In one embodiment of this invention, there is provided a method of forming a washer integrally with the walls of the thermoplastic tubing comprising a plurality of steps of inserting a guide pin means within the tubing so as to maintain a predetermined internal diameter with the tubing and the washer; emplacing a mold about the guide pin means and tubing to hold the tubing against longitudinal movement, the mold having a washer cavity to define the exterior dimensions and form of the washer, the tubing extending about the guide pin means and into the washer cavity; heating at least a portion of the wall of the tubing that is within the washer cavity to its softening temperature; and compressing the softened tubing wall longitudinally of the guide pin means to accordion the wall into a washer having an exterior film thereabout and having the accordioned wall therewithin to have an inherently outwardly biasing force, or springiness, that readily effects sealing interconnection with another conduit shape and that frictionally holds a tightened fitting in place.

In another embodiment of this invention, there is provided apparatus for automatically forming a washer integrally with walls of plastic tubing comprising a structural framework; feed means for feeding a first end of the tubing on which the washer is to be formed, the feeding means being disposed adjacent one end of the apparatus and aligned therewith; a first sensing means for automatically sensing when the tubing has been fed into place, the first sensing means being disposed so as to be responsive to the first end of the tubing; grabber means for holding the tubing; cutting means for cutting the tubing; heating means for heating the first end of the tubing to its softening temperature; control means for controlling, inter alia, the heating of the first end of the tubing; guide pin means for being inserted within the first end of the tubing of maintaining the internal diameter of the tubing and any washer formed thereon; insertion means for effecting the relative longitudinal movement between the guide pin means and the tubing; mold for moving about the tubing to hold it in place and define the form of the washer; plunger for forming the washer; second insertion means for inserting the plunger within the mold cavity; finalizing means for holding the plunger and guide pin means to form the washer and thereafter effecting opening of the mold, retracting the guide pin means, retracting the plunger so as to allow the washer and tubing to fall free and repeating the cycle of steps. A safety means is provided to prevent starting and to sound an alarm if the tubing and washer fails to fall free. The grabber means is operatively connected with the first sensing means so as to automatically clamp the tubing upon signal from the first sensing means. The cutting means is operatively connected with the first sensing means so as to automatically cut the tubing upon the signal from the first sensing means. The cutting means is disposed and adapted to cut at a predetermined location that automatically affects the correct length of the tubing. The heating means is disposed in alignment with the first end of the tubing for receiving the tubing and is connected with a source of energy for supplying the heat. The control means includes a means, preferably a timing means, that is connected with the heating means for controlling the time and duration of the heating of the first end to prevent forming a weakened spot by overheating. The guide pin means is carried by the structural framework and is at least moveable into alignment with the tubing so as to allow insertion within the tubing for predetermined distance for maintaining the internal diameter. The insertion means effects insertion of the tubing over the guide pin means and the guide pin means within the tubing and effects withdrawal of the guide pin means at the end of the cycle responsive to a withdrawal signal. The mold has a washer cavity to define the exterior dimensions and form of the washer. The mold is disposed such that the first end of the tubing extends into the mold cavity in operation. Preferably, the mold is a multiple piece mold that allows the pieces to be emplaced about the tubing. The plunger is, in effect, an annular piston that is disposed about the guide pin means and in alignment with the washer cavity so as to be able to compress and accordion the walls of the first end of the tubing longitudinally of the guide pin means and of the washer cavity so as to form the washer integrally with the tubing. The second insertion means is connected with the plunger carried by the structural framework and adapted to insert the plunger within the washer cavity with sufficient force to compress and accordion the walls longitudinally of the guide pin means and the washer cavity and into conformity with the mold space between the guide pin means and the washer cavity walls to form the washer. The finalizing means holds the plunger and the guide pin means in their forwardmost postion for a predetermined time interval long enough to form the washer and adhere a film exteriorly of the accordioned walls. Thereafter, the finalizing means effects opening of the mold, retraction of the guide pin means and retraction of the plunger. The repeat and safety means employs suitable means to detect the presence of the tubing and washer combination and either allows continued automated production or interrupts the production and sounds an alarm. The automated production sequencing and control operations that have been found most desirable are also provided in this invention.

BRIEF DESCRIPTION OF THE DRAWINGS

FIG. 1 is a top plan view of the apparatus for producing the integral plastic conduit and washer in accordance with one embodiment of this invention.

FIG. 2 is a partial perspective view of the feed means and the cutting means of the embodiment of FIG. 1.

FIG. 7 is a partial top perspective view of the apparatus of FIG. 1 showing cam and limit switch locations for controlling the advancement of the guide pin means and the plunger.

FIG. 8 is a partial perspective view of the apparatus of FIG. 1 showing an overall view of the control panel, structural framework and apparatus.

FIG. 11 is a partial cross sectional view of a final form of the combination of integral tubing and washer and fitting.

FIG. 12 is a partial cross sectional view showing an assembled embodiment of the integral plastic conduit and washer with the fitting thereover and engaging the holding means on a second conduit section.

DESCRIPTION OF THE PREFERRED EMBODIMENTS

Figure 3:
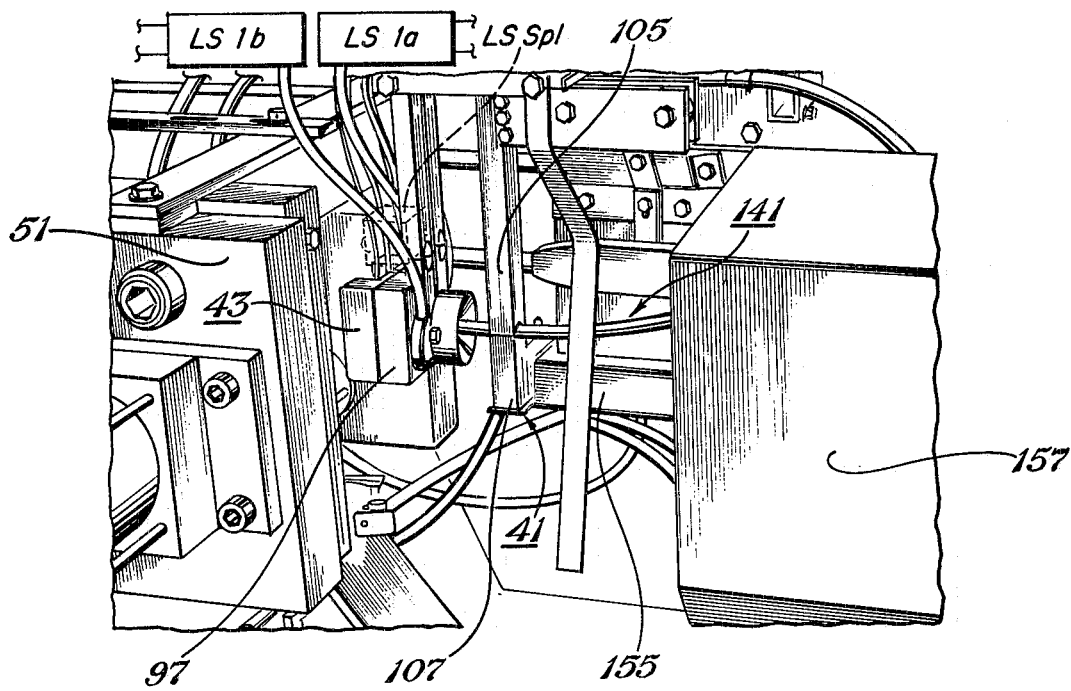
FIG. 3 is a partial side perspective view of the grabber means, heating means and mold of the embodiment of FIG. 1.

The descriptive matter hereinafter will be directed toward combinations of plastic conduit and washers for joining substantially cylindrical tubular conduit, normally one of which will be thermoplastic and have a fitting; and the method and apparatus for forming the conduit and washer. The term "conduit" is employed herein as synomymous with pipe, tubing, hose, and the like.

Typical of the thermoplastic materials of which the respective conduit and washer described hereinafter are formed are materials like polycrylonitrile butadiene styrene copolymer (ABS), polyethylene, polyvinyl chloride, polypropylene, polycarbonate, and other well known thermoplastic materials. Particularly preferable is the polybutylene type of thermoplastic conduit, such as is available from Southern Chemical Company, Inc., Metairie, Louisiana 70002.

Referring to the figures, more particularly to FIGS. 11 and 12, there is illustrated a plastic conduit combination 11 for being connected with a second conduit 13, FIG. 12. The second conduit 13 may be formed of the same or different material from the plastic conduit or other elements of the combination 11. As illustrated, the second conduit 13 is formed of a different material, such as wrought iron, steel, copper alloy, or the like. The second conduit 13 has a holding means, such as illustrated threaded section, or thread 15. The combination 11 includes a fitting 17, a tubular end 19 of conduit 21 and a washer, or shaped piece, 27. The fitting 17 is disposed concentrically about the tubular end 19 of a plastic conduit 21. The fitting 17 may be formed of metal, such as steel, aluminum or copper alloy; or of plastic, such as polypropylene, polybutylene, Nylon, Delrin, acrylonitrile butadiene styrene copolymer (ABS), polyvinyl chloride (PVC), and the like, as long as the material has adequate structural strength and rigidity. The fitting 17 is adapted to matingly engage the holding means for pulling the two conduits together. Specifically, fitting 17 has an interiorly threaded section, or thread, 23, that mates with the threaded section 15. The fitting 17 has a radially interiorly protruding flange, or shoulder, 25 for pulling a washer into sealing engagement with the end of the second conduit 13.

The conduit 21 may be of any desired length, ranging from several inches to several feet or yards. One of the most immediate commercial applications is the forming of combination conduit and shaped pieces for use with installing automatic clothes washers, dish washers, and the like. This invention is particularly useful in regard to such interconnecting hoses, since the shaped pieces are integrally formed with the tubing and cannot be lost from the fittings during transit, storage, and delivery; as are conventional fitting washers.

In this invention, a washer, or shaped piece, 27 is formed integrally onto the tubular end 19 and is adapted to fit interiorly of the fitting 17 and intermediate the shoulder 25 of the fitting 17 and the end of the second conduit 13. The shaped piece 27 is homogeneous with the tubular end, stronger than the walls of the tubing, and forms a sealing interconnection with the end of the second conduit when compressed thereagainst by the shoulder 25 of the fitting 17, when the fitting 17 is tightened against the holding means, or thread 15 of the conduit 13. Specifically, the shaped piece 27 has an outer film 29 and has accordioned walls 31 interiorly thereof. Consequently, the washer has an inherent outwardly biasing force, or springiness, because of the accordioned walls. This outwardly biasing force not only provides an improved sealing interconnection with the end of the second conduit compressed thereagainst, but provides additional frictional holding of the fitting 17 in its tightened relationship with the holding means 15 to maintain the sealing interconnection better than the prior art. In my concurrently filed and co-pending application Ser. No. 872,837, a continuation-in-part of application Ser. No. 728,232, referenced hereinbefore, there is described a preferred embodiment and the descriptive matter of that application Ser. No. 872,837 is incorporated herein by reference for details omitted herefrom. Specifically, the wall of the tubular end is heated to its softening temperature but not melted to a liquid. The softened wall is then accordioned back over a heating line between the heated, softened, wall and the unsoftened wall. Heretofore a weakness and breakage has been experienced adjacent the heating line- probably due to drawing, or forming a slight groove by inadvertent movement. In any event, the softened wall is accordioned back over, then compressed into a shaped piece that encompasses the heating line. Thereby breakage has been stopped, although it took a large amoutn of experience to do so.

It is believed helpful to consider the method steps and the options that are available with each of these steps before considering the apparatus. Accordingly, the following descriptive matter amplifies the individual steps of the method described hereinbefore under the Summary of the Invention. As one of the steps, a guide pin means is inserted within the tubing so as to maintain a predetermined internal diameter within the tubing. This insertion may be accomplished by relative movement between the guide pin means and the tubing. It is immaterial whether the guide pin means be inserted within the tubing, or the tubing inserted over the guide pin means, or some combination be employed to achieve the desired support of the internal tubing walls by the guide pin means. As will become apparent from the descriptive matter hereinafter with respect to the apparatus, in the disclosed step with the apparatus, the guide pin means is inserted part way, the tubing inserted thereover with substantially complete insertion following the gripping of the tubing by the mold halves that are clamped into place about the tubing.

The mold is emplaced about the tubing and the pin means to hold the tubing against the longitudinal movement. The mold has a washer cavity to define the exterior dimensions and the form of the washer that is formed integrally with the tubing. The mold is emplaced abut the tubing with the tubing extending about the pin means and into the washer cavity so that the wall of the tubing can be compressed into the form of the shaped piece by a plunger after the wall has been heated to its softening point.

The heating of the portion of the wall of tubing to its softening point, or softening temperature, may be done before insertion over the pin means and interiorly of the mold or after insertion over the pin means and within the mold. As will become apparent from the descriptive matter hereinafter with respect to the apparatus, in the disclosed embodiment, the tubing is heated before insertion over the guide pin means and within the mold, since it is more easily controlled and takes less time. If desired, suitable automatic controls such as thermostats and automatic switches may be employed to prevent overheating of the wall of the first end of the plastic conduit. Such controls maintain the temperature at that required to obtain softening but not so high as to produce a flowing liquid. Rather than employing elaborate thermostat controls and the like, it is frequently advantageous to employ a heating means to heat for a predetermined interval of time. This has been found particularly satisfactory when hot air or electrical heating is employed to heat the first end of the conduit. The instrumentation of turning on or emplacing the heater at a predetermined time and turning it off or removing it after a predetermined time interval is much simpler than employing the thermostatic controls with their unpredictable lag times and the like. Normally, a temperature within the range of 350°-650° F.; for example, about 450°-550° F.; is adequate. The important thing is that the temperature be high enough so that the walls can be accordioned and compressed; and the points of contact of the walls, interior or exterior, of the tubing will cohere to themselves and to any thermoplastic film that is formed about the accordioned walls; for example, accordioned by insertion of a plunger into the washer cavity and about the guide pin means.

The shaped piece 27 is formed by the insertion of the plunger to compress the softened tubing longitudinally of the guide pin means and into the washer cavity. The formed washer is cooled so as to retain its shape. Thereafter, the completed tubing and shaped piece are dropped free of the guide pin means, the plunger, and the mold.

Now the apparatus for carrying out the method of this invention will be described. One embodiment of the apparatus 33 for automatically forming the shaped piece 27 integrally with the tubing, or plastic conduit 21, is illustrated in FIGS. 1-10. Basically, the apparatus 33 includes a structural framework 35, FIG. 1, a feed means 37, FIGS. 1 and 2; a first sensing means 39, FIGS. 1, 2 and 4; a grabber means 41, FIGS. 1-5; a cutting means 42, FIG. 2; a heating means 43, FIGS. 1-5; a control means 45, FIGS. 4 and 10; a guide pin means 47, FIGS. 5, 9 and 10; insertion means 49, FIG. 1; mold 51, FIGS. 1, 3, 5, 6, and 10; plunger 53, FIGS. 1, 5, 9, and 10; second insertion means 55, FIGS. 1, 7 and 8; and finalizing means 57, FIGS. 1 and 10.

The structural framework 35 may comprise any of a plurality of structural members, such as angle iron, forming vertical supports (legs) and horizontal supports (body beams); panels for protection; and cross bracing, such as scrap iron, angle iron, or other steel or other metallic components. As illustrated, the structural framework comprises a plurality of angle iron members 59 extending longitudinally and supported by a plurality of vertically extending members 61, FIG. 7. The structural framework also includes laterally extending plates and members 63, FIG. 8, as well as supports for electric motors, hydraulic pumps, pneumatic compressors and the like (not shown). Preferably, the structural framework has feet on the bottom of the vertical members so as to sit on a level floor or the like and adapted to receive tubing fed by the feed means 37.

The feed means 37 includes a tubing spool 65 on which is stored the tubing 66. The tubing 66 passes through a straightener 67. The straightener 67 comprise a series of pulleys that bend the tubing 66 opposite the direction in which it has been bent on the spool 65 so as to leave it in a substantially straight condition. Tubing 66 is then passed through one or more feeding pulley sets 69 for being fed into the combination apparatus 11. As can be seen in FIG. 2, each of the feeding pulley sets 69 comprises an idler pulley 71 and powered pulley 73. The powered pulley 73 is supported on the shaft of a motor 75 (or gear reducer if employed). During feeding, the tubing 66 passes through an alignment means comprising alignment bar 77 and tray 79. The alignment means may comprise only one segment or may comprise a plurality of segments depending upon the length that the tubing is to be cut. As illustrated, there are two segments with a space between them. As will become completely clear from the descriptive matter later hereinafter, the tray 79 can be advanced to form a tubular enclosure, or feeding guide, through which to effect feeding of the tubing 66; or can be retracted to allow the tubing to be moved downwardly, referred to herein as being transferred down. The tray is advanced by tray advancing means 81 and is retracted by tray retracing means 83, FIG. 2.

The tray advancing means 81 includes pneumatically operated rams 85 and advancing portion 87 of a valve for extending the rams, and pushing the tray into the position to form the tubular structure through which to feed the tubing. The portion of the valve 87 is connected by way of suitable conduit 89 to the cylinder end of the ram 85 for putting pressure under the piston and extending the rams.

The tray retracting means 83 includes a retracting portion 91 of a pneumatic valve for effecting retraction of the pneumatic rams 85. The retracting portion 91 of the valve is connected by a suitable conduit 93 with the rod side of the ram 85 to put pressure on the rod side of the piston and effect retraction of the ram and open the tubular means for allowing the tubing 66 to be transferred downwardly.

As illustrated, the tray 79 is advanced and retracted along tracks 95 for smooth operation and alignment. The tracks 95 do not extend forward into the paths of the tubing 66 when it is transferred down. Suitable limit switches such as LS2 and LSTF are placed so as to register the reaching of the limits of travel of the tray for activating respective other steps, as delineated later hereinafter. Specifically, the limit switch LS2 is employed to register the retraction of the tray so as to enable transferring downwardly the tubing 66. The limit switch LSTF, registers when the tray has advanced to its forward position so as to energize the feed means for feeding the tubing through the tubular enclosure, or feeding guide, formed thereby. When the tubing 66 is fed through the feeding guide, it is arrested in its forward travel by the first sensing means 39.

Figure 4:
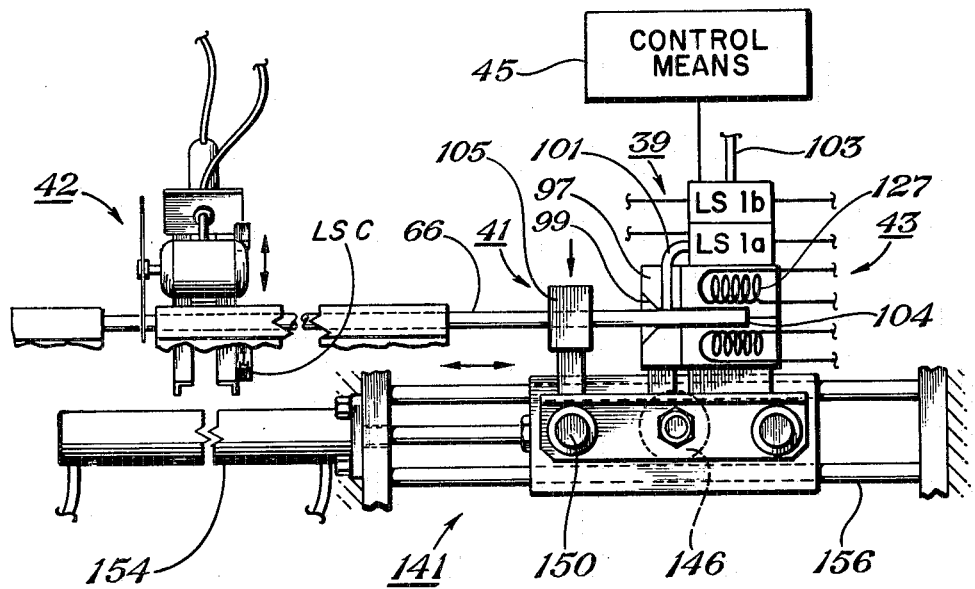
FIG. 4 is a partial top plan view, somewhat schematic, showing the insertion of the tubing into the block to actuate the initiating switches.

The first sensing means 39 comprises a ported entry block 97, FIGS. 2-4, having a funnel shaped entry cone 99, FIG. 4, to guide the tubing thereinto. preferably, as illustrated in FIG. 2, the first sensing means comprises a plurality, such as two, pieces that can be separated to allow the completed tubing and integrally formed washer to fall free. As illustrated, the first sensing means 39 is formed in a clamshell construction operable like the heater means 43, described in more detail later hereinafter. The first sensing means 39 also includes air passage 101 through the ported entry block 97 and pressure responsive switches LS 1a and LS 1b. The switches LS 1a and LS 1b respond to the arrival of the tubing to block the air passageway 101 and its port. They stop the forward movement, or feeding of the tubing with the end 104 protruding for being heated by the heater. Air is fed to the pressure responsive switches and the air passageway 101 by conduit 103. As will become clear from the descriptive matter later hereinafter, among the other things that the switches LS 1a and LS 1b do are to activte and cause the grabber means 41 to clamp onto the tubing 66.

The grabber means 41 comprises top jaw 105 and bottom jaw 107; FIG. 2. The top jaw 105, 1-5 is reciprocally movable so as to move downwardly into gripping contact with the tubing 66 upon appropriate signal from the switch LS 1a, as will become more clearly apparent from the description later hereinater. The reciprocal movement is effected by a pneumatically operated ram and valve (not shown) that is operably connected to the switch LS 1a and mounted on a mounting means. In addition, the entire mounting means can be moved reciprocally along respective perpendicularly mounted tracks so as to be raised and lowered and moved forwardly for insertion and restored, as described later hereinafter.

The bottom jaw 107 is pivoted into gripping position as well as being pivoted out of the position. Specifically, the bottom jaw 107 is mounted rigidly onto arm 109 that is connected with pivot shaft 111, as by set screw. The shaft 111 is journalled in bearing 113 for pivotal movement responsive to a pneumatic ram 115. Specifically, the other end of the pivot shaft 111 is connected by way of a lever 117 to the rod side of the pneumatic ram 115.

The pneumatic ram 115 is operably connected by way of conventional pneumatic valve (not shown) with switch LS 1a. As indicated hereinbefore, the switch LS 1a activates the grabber means 41 to grab the tubing responsive to insertion of the end of the tubing within the entry block 97. The grabber means 41 thus holds the tubing even after it has been cut by the cutting means 42.

The cutting means 42 comprises a knife wheel 119 mounted by way of shaft 121 driven by motor 123. The motor 123 is moved toward the tubing 66 by way of tracks 125 responsive to urging of a pneumatically operated ram (not shown). The pneumatically operated ram and the energizing of the electric motor 123 is effected responsive to the switch LS 1b when the end of the tubing is inserted within the entry block 97, as described hereinbefore with respect to the first sensing means. When the tubing is cut, as shown by the advancement of the motor to a predetermined position along the tracks, a limit switch LSC is tripped. Tripping LSC signals and ultimately effects restoring of the cutter means to its original position and de-energizing the motor 123. as well as retraction of the tray 79. The cutting means may be positioned at any appropriate location to cut the tubing to the desired length. As illustrated, it is positioned such that the knife wheel, or blade, 119 can cut the tubing intermediate the sections of the tray and alignment bar 79 and 77.

While a cutting wheel has been illustrated hereinbefore as the cutting portion of the fitting means 42, it is readily apparent that scissor type cutting means can be employed to cut the tubing. In fact the scissors type cutting means that are activated by pneumatic rams have been employed successfully in this operation. In any event, the cutting means is operably connected with a first sensing means so as to automaticlly cut the tubing upon signal from the first sensing means. The cutting means 42 is disposed and adapted to cut tubing at a predetermined location that automatically effects the correct length of tubing after the end has been inserted within the first sensing means, and before the end is heated by the heater means 42.

The heater means 43 is provided for heating the first end of the tubing to its softening temperature. The heater means is disposed in alignment with the first end of the tubing for receiving the tubing and is connected with a source of energy for supplying heat to heat the tubing end to its softening temperature. The heater should develop a temperature in the range of 550°-650° F., preferably 600°-625° F. As illustrated, the heater means 43, FIGS. 1-5 is an electrically heated unit having heating coil 127 therewithin. Specifically, the heater is formed in a clam shell construction that opens to allow the tubing to be moved forwardly for insertion over the guide pin means and within the mold cavity. The opening also allows the completed tubing and washer to fall free upon completion of the forming of the washer with the tubing. The respective halves of the clamshell heater are moved toward and from each other by pneumatically operated ram 129 powering scissor tongs 130 and serving as the open means and close means. As illustrated, tracks 132 support the clamshell halves. It has been found preferable to support the means, such as the scissor tongs, opening and closing the clamshell halves. Tracks 132 are open at the center to allow tubing to be moved forwardly into the mold.

If desired, the heater means 43 may be heating at all times and the clamshell closed when it is desired to heat the end of the tubing and opened after the proper amount of time to get the exact degree of softening for the results described hereinafter. As illustrated, the control means 45 comprises a timer means 131, FIG. 10, the timer means thus effects opening of the heater means 43. The timer means 131 may comprise any of the usual timers that will time out one or more predetermined intervals and then emit a signal to effect an end result, such as opening of the heater means 43. Preferably, the timer means 131 has a means for setting the length of the timer interval desired in order to allow compensating for a variety of types of hoses, plastics, and wall thicknesses. The control means 45 is also connected with a tubing insert means for effecting forward movement of the heated tubing end for insertion within the mold cavity and for partial insertion of the tubing over the guide pin means 47.

Figure 5:
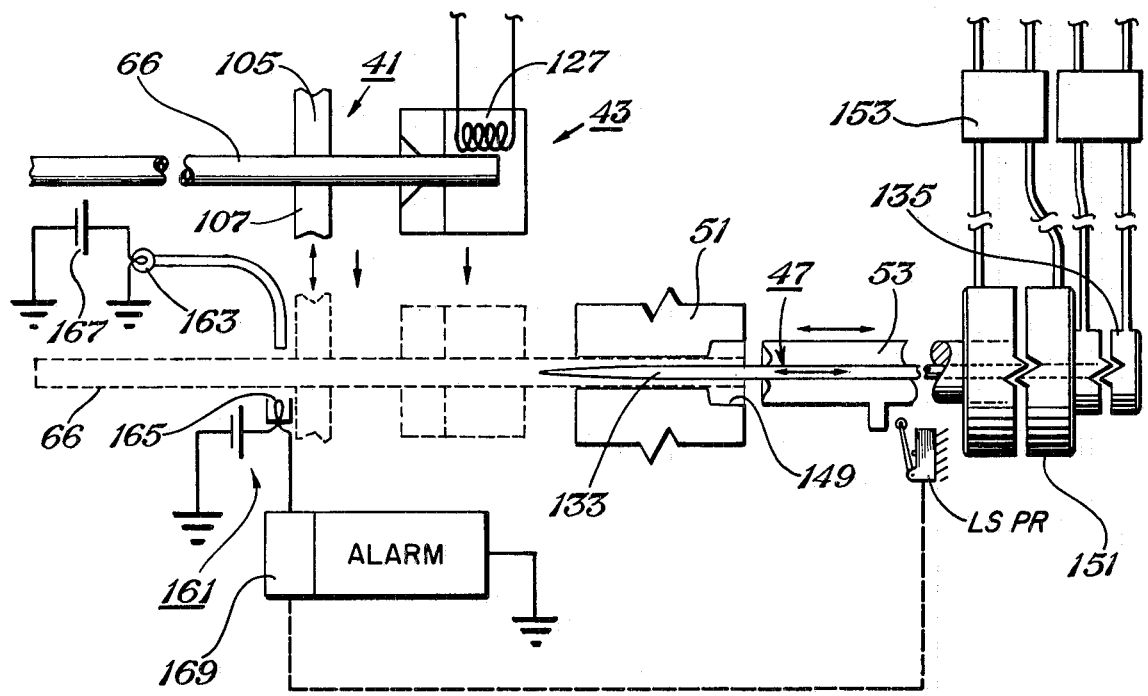
FIG. 5 is a partial side elevational view, somewhat schematic, showing the heating of the first end of the tubing, insertion of the tubing within the mold and over the guide pin means before insertion of the plunger into the washer cavity.
Figure 9:
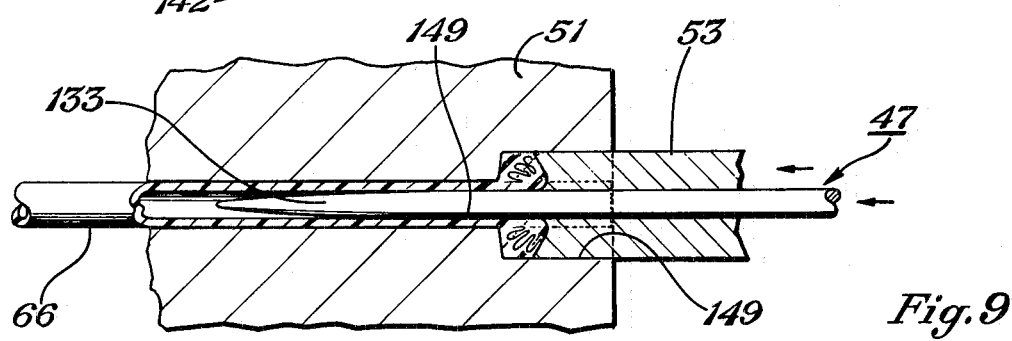
FIG. 9 is a partial cross sectional view showing the forming of the washer by the advancement of the plunger into the washer cavity of the mold with the tubing in place.

The guide pin means 47 comprises a hard smooth pin 133, FIGS. 5 and 9 for insertion interiorly of the tubing 66 positions LS to support the inner wall and maintain internal diameter even while the washer is being formed by the accordioned compression of the side wall of the tubing. As illustrated, the guide pin 133 is formed of stainless steel although other equally hard, smooth metals may be employed. For example, titanium, aluminum, magnesium, and the like can be employed. It is preferable to employ a tough material that is resistant to corrosion, such as titanium and stainless steel pins. The guide pin means 47 is connected to a hydraulically operated ram 135, serving as the advancing means and the retracting means for advancing and retracting the guide pin to its respective positins delineated hereinafter. Rigidly connected with the guide pin 133 so as to advance and retract therewith is the cam rod 137, FIG. 7, carrying the reciprocally movable cam 139 for activating the respective limit switches controlling the stopping, advancing and retracting of the guide pin. These respective limit switches are LS GP PF (limit switch for guide pin partial forward position), LS GP FF (limit switch for guide pin in the full forward position) and Ls GP R (limit switch for guide pin in its full retract position). These limit switches are shown in FIG. 7 and schematically illustrated in FIG. 10.

The hydraulically operated ram 135 serves as a part of the insertion means for effecting relative longitudinal movement between the guide pin means 47 and the tubing 66 so as to effect insertion of the tubing over the guide pin means and the guide pin means within the tubing a predetermined one or more distances. Also serving as part of the insertion means is the tubing insert means 141. The tubing insert means 141, FIGS. 1 and 3, comprises a rack mounted structure 142 that enables moving the grabber means comprising top and bottom jaws 105 and 107 forwardly so as to emplace the heated end of the tubing into the mold 51 after the heater means 43 has been opened to allow this forward movement. As illustrated, the tubing insert means 141 comprises a relatively large mounting means, or structure, 155, FIG. 1, that is moved upward and downward by pneumatic ram 146 along tracks 150 and forward and rearward by a hydraulic ram 154 along tracks 156. When the proper forward movement of the tubing has been made, a limit switch LS Spl (limit switch special insert) will be activated to stop further insertion of the insertion means 141 and close the mold 51. Activation of the limit switch LS Spl also signals the release means to cause the grabber means 41 to release the tubing 66 that is now partly over the guide pin means 47 and within the mold 51.

The mold 51 is carried by the structural frame work 35 so as to be movable about the end of the tubing to hold the tubing in and away so as to let the tubing and washer fall free. Specifically, the mold 51 defines a tubing and washer cavity that defines the outer dimension and form of the washer that is formed integrally with the tubing when the softened tubing walls are compressed into the shaped piece. The mold is disposed such that the first end of the tubing extends into the mold cavity in operation. As illustrated, the mold 51 is a multiple piece unit. Specifically, it is a two-piece unit, FIGS. 3, 6 and 9. Each of the two pieces are mounted to move reciprocally laterally of the apparatus 11. Each of the two pieces of the mold may be moved on tracks, or guides, 142, FIG. 6, if desired to effect smooth operation, but the tracks must allow the completed tubing and washer to drop free. It has been found preferable to employ sturdy hydraulic rams that obviate the need for the tracks 142. The respective two pieces of the mold are moved by hydraulically operated rams 143. The rams 143 are connected by suitable conduits 144, FIG. 6, with a switching valve 145 that is also connected by conduits 147, 148 with the hydraulic pump (not shown) and the hydraulic reservoir (not shown). Thus the two pieces can be moved together to define the cavity 149, FIG. 9 for receiving the tubing and for forming the washer. The mold pieces are moved together by the close means formed by the switching valve 145 and the hydraulic ram 143. Conversely, the mold 51 has its respective two pieces moved apart by the open means formed by the other half of switching valve 145 and the rams 143 moving oppositely.

Closure of the mold 41 activates the limit switch LS MC (limit switch, mold closed.) The limit switch LS MC then signals the transfer of the mounting means back and up to receive the tubing. The mounting means has mounted thereon the first sensing means 39, grabber means 41, and heater means 43.

Figure 6:
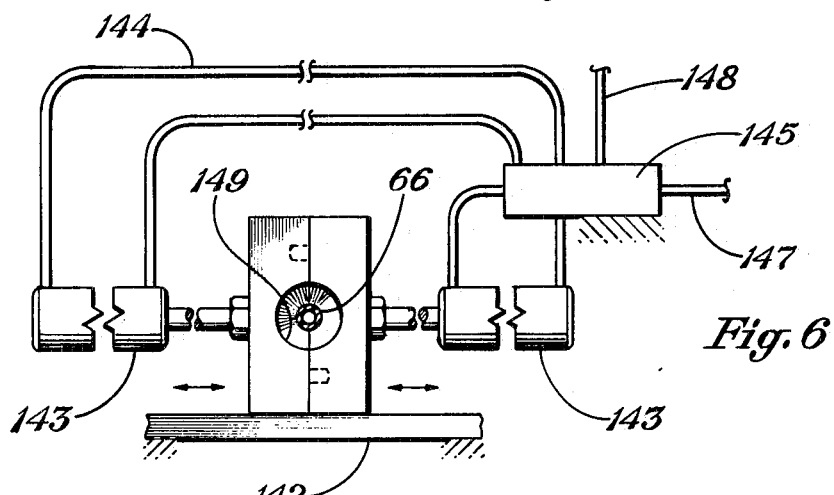
FIG. 6 is a partial rear end view of the mold of FIG. 5.

The mold 51 is formed of a high structural strength material, preferably steel or aluminum or other solid metallic material. Preferably it is formed of the material that has high structural strength and that resists corrosion under the elevated temperature of the end of the tubing. As can be seen in FIG. 6, when the two pieces are pushed together, the tubing 66 is received in the inner cavity. As can be seen in FIG. 9, the tubing is inserted over the pin 133 so that the inner diameter is maintained true during the forming of the washer by the advancing of the plunger 53.

The plunger 53 is disposed concentrically about the guide pin means 47 and in alignment with the washer cavity 149. The plunger 53 is adapted to move longitudinally of the guide pin means and is powered by a hydraulic ram 151, FIG. 5. Hydraulic ram 151 and the switching valve 153 serve as the respective advance means and retract means, FIG. 10. Rigidly connected with the plunger 53 so as to advance and retract therewith is cam rod 158 carrying the reciprocally movable cam 160 for actuating limit switch LS PR. The plunger 53 is formed of a high structural strength material; such as, metal like stainless steel or aluminum; so as to be able to compress and accordion the softened walls of the first end of the tubing 66 by moving longitudinally of the guide pin means 47 and within the cavity 149 so as to form the washer integrally with the walls of the tubing 66. The hydraulic ram 151 and the switching valve 153 serve as a second insertion means for inserting the plunger within the washer cavity with sufficient force to compress and accordion the walls longitudinally of the guide pin means and the washer cavity. The force is also sufficient to mold the washer into conformance with the surfaces defined by the walls of the washer cavity 149, the guide pin 133 and the plunger 53 when it is in its full forward position. If desired, limit switches can be emplaced at the extremities of travel to neutralize the switching valve 153 once the plunger has reached either its full forward or full reverse position.

As illustrated, however, the signal to advance the plunger forward is given when the guide pin means 47 has tripped its limit switch for the full forward position. This starts the timer means 2. Upon the expiration of the predetermined time, the timer means 2 effects the retract signal that causes the switching valve 153 and the hydraulic ram 151 to retract the plunger 53. This insures that the force of the hydraulic pressure is maintained on the washer during the time it is being molded, as determined by timer means 2. A limit switch LS P R for the plunger return is provided to neutralize the hydraulic pressure on the retraction means; that is, on the hydraulic ram; once the plunger has been retracted. The timer 57, timer means 2, serves as a finalizing means for holding the plunger and the guide pin means in their forward positions for a predetermined time interval long enough to form the washer and adhere a film to the accordioned walls of the washer and thereafter effect a plurality of events. The plurality of events effected are:

(1) opening of the mold 51 by energizing the open means; thereby allowing the integrally formed washer and tubing to fall free;

(2) retracting the guide pin means by energizing the retract means, thus freeing the guide pin means from the interior of the tubing and washer; and (3) retracting the plunger.

With the foregoing pieces of apparatus, this invention forms, in the method aspects, a washer integrally with the walls of thermoplastic tubing by a multiplicity of steps that include:

(a) inserting a pin means within the tubing so as to maintain a predetermined internal diameter within the tubing and the washer that is formed thereon;

(b) emplacing a mold about the pin means and the tubing to hold the tubing against longitudinal movement, the mold having a washer cavity to define the exterior dimension and form of the washer, the tubing extending about the pin means and into the washer cavity;

(c) heating at least a portion of the wall of the tubing that is within the washer cavity to its softening temperature and, thereafter;

(d) compressing the softened walls of the tubing longitudinally of the pin means and within the tubing cavity to accordion the walls into a shaped piece type washer having an exterior film and having the accordioned wall within the film to have an inherent outwardly biasing effect that readily effects sealing interconnection with another conduit shape and that frictionally holds a tightened fitting against loosening.

The method may be understood by referring to the following flow diagram.

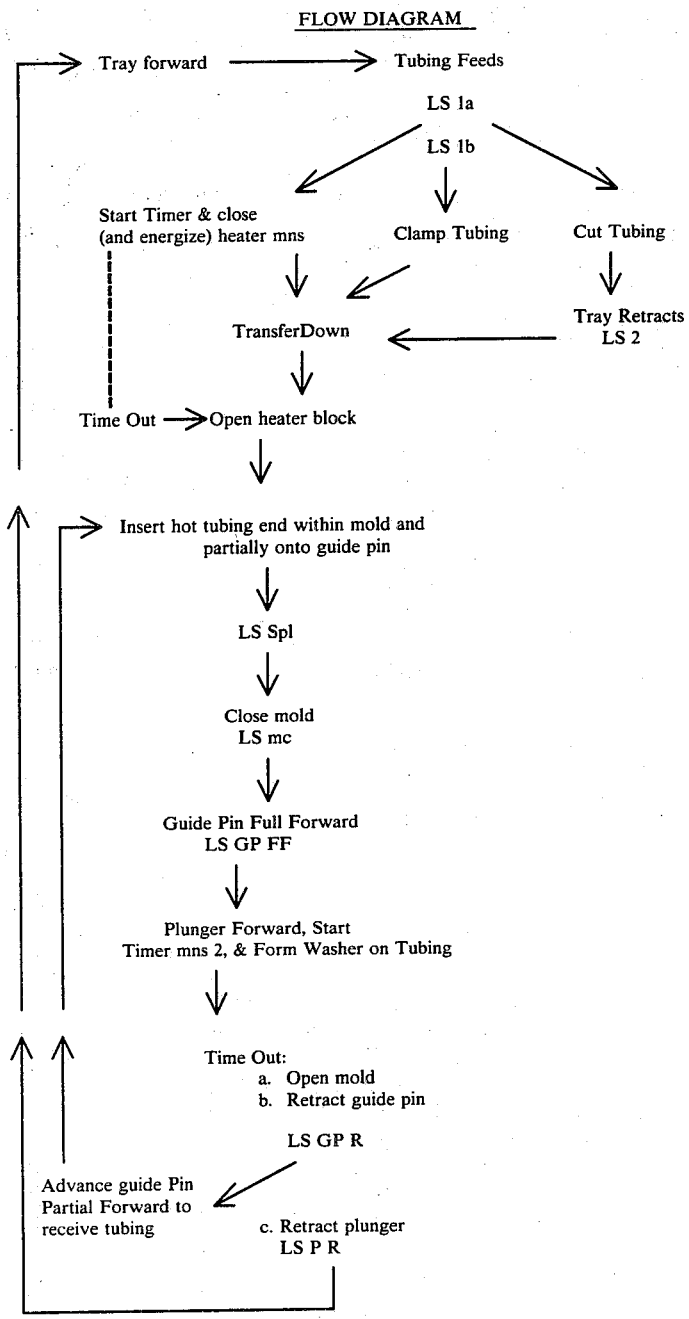

FLOW DIAGRAM

Figure 10:
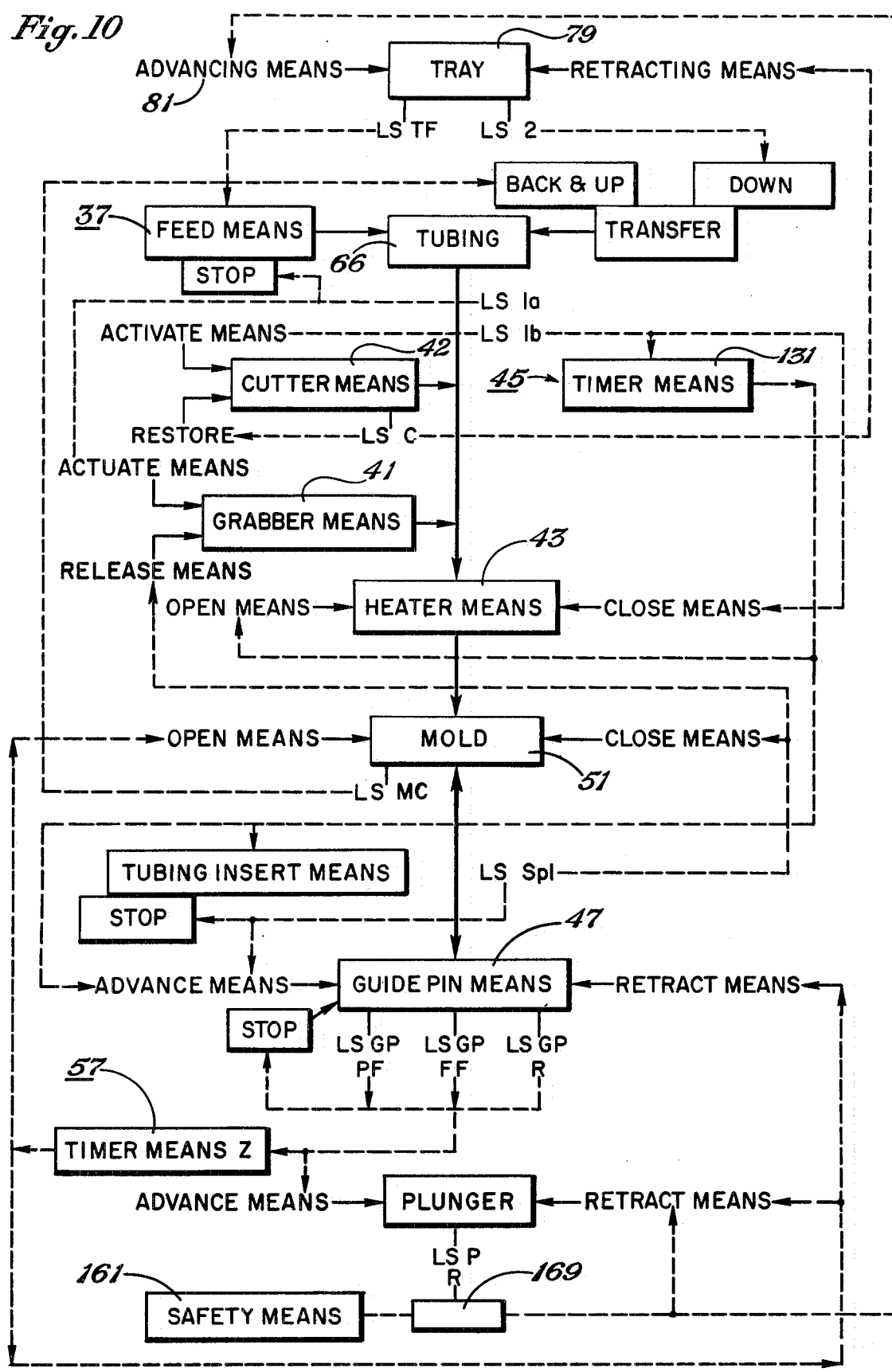
FIg. 10 is a diagrammatic and schematic view showing the control and sequence of operations of the apparatus for mass producing the integral tubing and washer.

The flow diagram can be related to the apparatus by referring simultaneously to the Figs., and particularly FIG. 10. Specifically, the tray 79 will have been moved forward by energizing the advancing means 81. When the tray trips the limit switch LSTF showing the tray forward, the feed means 37 is energized, feeding the tubing 66.

During the time that the tubing is being fed by the feed means, the motors of the feeding pulley sets 69 are energized to rotate the meshing drive and idler pulley with the tubing 66 intermediate the two so as tp advance the tubing. As the tubing is unrolled from the spool 65, it passes through the tubing straightener 67 so as to straighten out the kink that has been induced thereinto. Tubing is fed then up the tube created by the alignment bar 77 and the tray 79 when it is advanced into its forward position. The tubing then closes off the air passage ways and activates the limit switches LS 1a and LS 1b.

The terminology "trips" or "activates the limit switch" is employed herein, since it is relatively immaterial whether a limit switch be opened or closed as long as it is employed with compatible electronics to effect the desired end result.

The activation of switch LS 1a and LS 1b energizes the activate means and causes the grabbe means 41 to clamp the tubing. Simultaneously, it energizes the activate means for the cutter means 42 and causes it to cut the tubing. When the cutter means 42 has cut the tubing, it activates the limit switch LS C, as noted hereinbefore. Activation of the limit switch LS C causes the cutter means to be restored, or moved back to its original position by its switching valve (not shown) and pneumatic ram, so as to allow the tubing to be fed again. Activation of the limit switch LS C also effects retraction of the tray 79 by its respective switching valves and pneumatic rams 85. If desired the switch LS 1a can be employed, simultaneously, to energize the retracting means 83 to retract the tray 79. Retraction of the tray 79 activates the limit switch LS 2.

The activation of the limit switches LS 1a and LS 1b, in addition to the foregoing, simultaneously energizes the timer means 131 serving as part of the control means 45 and energizes the close means for the heater 43 to close the heater about the end of the tubing 66 for heating the latter. Preferably, the heater means 43 is energized to remain hot at all times. If not, the timer means 131 turns on the heater means 43 when the timer is started.

The closre of the limit switch LS 2 by the tray retracting causes the transfer down of the entire transfer block containing the heater, the grabber means 41, the tubing 66. The downward transfer is effected by energizing the down portion of the transfer block. As indicated hereinbefore, the entire transfer block, or mounting means, 155, FIGS. 1 and 3, is mounted for movement vertically and longitudinally along respective tracks 150 and 156 and forms a part of the tubing insertion means 141 so as to be movable for insertion of the end of the tubing 66 over the end of the guide pin means 47 once aligned therewith. The vertical movement to effect the alignment of the tubing 66 with the guide pin means 47 is effected by way of a pneumatically operated ram 146. In FIG. 3, the ram is hidden behind a cutter housing 157. Up and down limit switches are not necessary, since pneumatic pressure can be retained on the pneumatic ram without adverse effects. if desired, however, respective up and down limit switches can be employed to neutralize the switching valve effecting upward and downward movement of the pneumatic ram 146.

The timer means 131 times out. Preferably, as indicated, the timer means 131 is adjustable such that the time interval can be varied as low as 2 seconds or less to as much as 55 seconds or more. Typical time means for heating the end of the tubing 66 might be, for example, about 5 seconds for a standard wall thickness polybutline tubing of about ¼ inch tube size. Of course, the time interval is longer for larger, thicker walled tubing. Moreover, the optimum time varies with the material of which the tubing is made. It is important that the correct and optimum time be arrived at for the respective tubing in order to obtain the desired characteristic for forming walls that will accordion back over a heating line to prevent breaking and within an exterior film to have the desired springiness in compression for sealing fitting with another end of a conduit and for retaining the tightened fitting without loosening. In any event, after the expiration of the time, the timer means 131 signals the open means to open the heater 43. Thus the pneumatic ram opens the heater block rapidly to allow insertion of the heated end of the tubing over the guide pin means 47 and within the mold 51.

Simultaneously, the timer means 131 signals the advance means of the guide pin means 47 to move it to its partial forward position and signals the tubing insert means to insert the tubing over the partially advanced guide pin means 47. The respective advancings are effected by hydraulic rams 135 for the guide pin and 154 for the tubing 66.

The forward movement of the guide pin means 47 by its hydraulic ram 135, FIG. 5, trips the limit switch LS GP PF to stop the advance of the guide pin means 47.

The insertion of the tubing over the guide pin means by its hydraulic ram 154 trips the limit switch LS Spl. This indicates that the tubing has been inserted to the proper position such that its heated end will be within the mold cavity of the mold 51 when the mold is closed. It is imperative that the heating line between the softened tubing wall and the unsoftened tubing wall be exposed so that the shaped piece, or washer, can be formed over it to reinforce any weakness that tends to form. This prevents breakage adjacent the heating line. Thus of the tubing in the washer cavity 149, the heated, softened portion comprises 50–95 percent of the total. Closure of the limit switch LS Spl stops further insertion of the tubing 66 by the tubing insert means 141; that is, it stops forward movement of the hydraulic ram 154 moving the transfer block, or mounting means, 155 holding the grabber means 41 and tubing 66. Also, closure of limit switch SL Spl energizes the close means for closing the mold 51. Specifically, it moves the switching valve 145 to cause the hydraulic rams 143 to be moved to close the halves of the mold 51 and hold the tubing 66 against longitudinal movement with its heated end over the guide pin 133 and in the mold cavity 149. Closure of the limit switch LS Spl also energizes the release means of the grabber means 41 to allow the upper and lower jaws 105, 107 to be transferred backwardly and upwardly without taking the tubing 66 with them.

Closure of the limit switch LS Spl also energizes the advance means for advancing the guide pin means 47 to its full forward position.

The mold 51 has its limit switch LS MC energized by closure of the mold half. Closure of the limit switch LS MC energizes the "back and up" portion of the transfer block such that its pneumatic ram transfers the entire mounting means 155 backwardly and upwardly to receive the incoming tubing 66 when it is again fed.

When the guide pin means 57 has been moved to its full forward position, it trips the limit switch LS GP FF showing the limit switch has been energized for the guide pin in its full forward position. Closure of the limit switch LS GP FF stops further insertion, or advance, of the guide pin means 47.

Closure of the limit switch LS GP FF simultaneously energizes the advancing means for the plunger 53 and turns on the timer means 2, or the timer 57. The plunger 53 is advanced forwardly about the guide pin 133, compressing and accordioning the softened tubing walls and forming a film of softened plastic thereabout, as illustrated in FIG. 9. As will be apparent, relatively high hydraulic pressure is required in the hydraulic ram 151 to advance the plunger 53. Accordingly, the limit switch LS MC may be a physical limit switch on the mold or it may comprise a high pressure hydraulic switch to delay advancing the plunger 53 until suitable hydraulic pressure has been reached to ensure the forward movement of the plunger 53 in a one smooth motion to obtain the desired results. Either way it will operate satisfactorily.

As indicated hereinbefore, the timer means 2, or timer 57, should have the same settable characteristics as timer means 131 in order to allow for setting in the optimum time for forming the washer on the end of the tubing. The optimum time will depend upon the materials of which the tubing is formed, as well as the thickness of the walls of the tubing, dimensions of the washer cavity and the guide pin 133. Preferably, the time interval should be settable between as low as 2 seconds or less to as much as 55 seconds or more. A time interval of about 5-8 seconds has been found to be satisfactory for a ¼ inch standard polybutylene tubing.

When the timer means 2 times out, it simultaneously provides a plurality of signals. First it signals the open means to open the mold 51 so that the integrally formed washer and tubing end can be stripped, or dropped, therefrom; as by being dropped into a receiving basket. It also signals the retract means of the guide pin means 47 so the guide pin means withdraws the guide pin 133 from interiorily of the tubing to allow the tubing and washer to fall free. Thirdly it signals the retract means to retract the plunger 53.

The mold 51 is opened. If desired, suitable limit switches may be provided to neutralize the pressure on the rams opening the mold 51.

When the guide pin means 47 is fully retracted, it depresses the retraction limit switch LS GP R. The depression of the limit switch LS GP R prepares the advance means for advancing the guide pin means 47. As a matter of fact, the apparatus can be operated by allowing the limit switch LS GP R to energize the advance means to advance the guide pin means 47 to its partial forward position and obviate the requirement for interconnection between the advance means and the timer means 131, if desired.

When the plunger is fully retracted depressing limit switch LS P R, the advancing means 81 is energized to move the tray 79 forward. Movement of the tray foward energizes the limit switch LS TF.

Depression of the limit switch LS TF energizes the feed means and causes the tubing 66 to feed forwardly to repeat the cycle as described hereinbefore.

A safety means 161, FIG. 5 is provided to prevent start of a second cycle until the integral tubing and washer has been stripped from the apparatus 11. The safety means 161 comprises a source of light 163, FIG. 5, and a photo detector 165 for detecting the light once the tubing 66 has been stripped from therebetween. Both the light source 163 and the photo detector 165 have their respective power sources 167. The safety means 161 is connected into the mechanism, as by way of the limit switch showing the retraction of the plunger, LS P R, so as to sound an alarm if the tubing and washer are not stripped away, as evidenced by light being received by the photo detector 165. A conventional implementing circuit is employed in the alarm control 169 to effect the alarm responsive to signal from the photo detector 165 in conventional manner. In addition, the control 169 provides an interrupt to prevent the repeating of the cycle. It will be apparent that the control 169 may be connected with the limit switch showing the full retraction of the guide pin means 47, the opening of the mold 51 or the like. It is imperative that the safety means not sound the alarm or prevent repetition of the cycle as long as the parts are stripped away at the appropriate time. Also, the safety means 161 should not sound the alarm when the tubing is inserted during the period when the washer is being formed.

Each cycle of this combination 11 has been worked down to a fine art such that the entire cycle can be done in about 15 to 18 seconds, so that a piece of tubing has a washer formed on one end each 15 to 18 seconds. This allows highly effective automated production as described hereinbefore and forms the washer such as illustrated in FIGS. 11 and 12, similarly as described hereinbefore.

As will be appreciated, the relatively complicated combination 11 offers the possibility of almost endless variations and any connections of respective elements of control and operating apparatus for more efficient operation. Initially, there were employed relatively more complicated circuits having timers to time the respective operations. It was found, however, that sequentially operating units could be employed to operate more rapidly with less complicated circuits. There are a plurality of safety interconnections to prevent inadvertent operation of respective elements before a sequentially preceeding operation has been performed. These safety interconnections are standard and need not be delineated in detail herein. It is sufficient to note that the respective safety interconnections are housed in cabinet 171, FIG. 8. In addition, the control system allows manually controlling the various pieces of apparatus to obtain the desired speed of operation, as well as fully automated operation such as described hereinbefore.

Moreover, a wide variety of different pieces of apparatus, or elements of the combination, may be employed instead of those described herein. For example, as delineated hereinbefore, a knife blade cutter actuated by suitable pneumatic ram or the like can be employed as the cutting means 42. The guide for the tubing being fed into the heater block may comprise elements other than the illustrated alignment bar 77 and tray 79 if desired. If desired, the respective grabber means and transfer block may comprise two different sets, one movable vertical and one movable horizontally, instead of a single set that moves along both axes as described hereinbefore.

Conventional hydraulic pumps generate the hydraulic pressure responsive to torque imparted by an electric motor, the hydraulic pressure being that necessary to operate with great force the hydraulically operated rams, and up to 3000 pounds per square inch if necessary. Also, the electric powered air compressors supply the compressed air for operating the pneumatically operated rams, controls and the like. These conventionally operated elements need not be described in detail to lengthen this already lengthy application and have been omitted, since they are within the skill of the art.

The details of interconnection of conduit between the switching valves, the hydraulic rams, the pneumatic rams are similar to that illustrated in FIG. 6 and need not be described in greater detail since they too are within the skill of the art.

While the formation of the washer integrally with the one end of the tubing has been shown hereinbefore, it is readily apparent that, if desired, the respective outer fittings may be emplaced on the tubing following the formation of the washer and a second washer emplaced on the other end by the same procedure of heating the walls of the tubing and compressing them to accordion them into the washer integrally with the tubing. On the other hand, of course, any of the conventional type fittings may be employed for joining the other end to a particular conduit, fitting or the like. The outer fittings with the interiorly protruding shoulders will, of course, be emplaced on the hose with the threaded sections facing outwardly over the washers that are formed on the respective ends if that technique is employed. Because of the requirement of putting the outer fitting onto the tubing facing the proper direction, the second step may be performed either manually or in an assembly line production method. In the latter, each of the respective fittings facing the properly oriented direction is inserted over the blank end of the tubing and thereafter, that end of the tubing is fed to the apparatus that softens the wall of the tubing and forms the washer similarly as that portion of the combination 11 has been described hereinbefore. Expressed otherwise, that free end of the tubing is inserted with a mold over a guide pin, the end is heated either before or after insertion and then the softened walls are accordioned by a plunger to automatically form the washer integrally with the end of the tubing.

From the foregoing it can be seen that this invention accomplishes the objects delineated hereinbefore. Specifically, it provides an inexpensive method and apparatus for effecting joinder of plastic conduit to other conduit while retaining the sealing interconnection against fluid leakage, retaining a tightened frictional fitting in place, preventing breakage of the conduit adjacent a heating line, and obviating the disadvantages of prior art structures. Specifically, in the combination aspects, this invention provides the apparatus for forming the plastic conduit and washer integrally together to facilitate joining to a second conduit and provides for the automated production of the combination of the integrally formed washer and plastic conduit of predetermined lengths, types of hoses and the like. While the development of the apparatus has been expensive and time consuming, it has been found to be exceptionally worthwhile since it enables producing the integrally formed washer and tubing in about 15 seconds each for a given end. Thus a single machine may supply large number of the integrally formed washers and tubing.

Although the invention has been described with a certain degree of particularity, it is understood that the present disclosure is made only by way of example and that numerous changes in the details of construction and the combination and arrangement of parts may be resorted to without departing from the spirit and the scope of the invention.

What is claimed is:

1. Apparatus for automatically forming a washer integrally with walls of a thermoplastic tubing comprising:
   a. a structural framework;
   b. feed means for feeding a first end of the tubing on which the washer is to be formed; said feed means being disposed adjacent one end of said apparatus and aligned therewith;
   c. first sensing means for automatically sensing when said tubing has been fed into place; said first sensing means being disposed so as to be responsive to said tubing being fed to said apparatus;
   d. grabber means for holding said tubing; said grabber means being operatively connected with said first sensing means so as to automatically clamp said tubing upon a first signal on said first sensing means;
   e. cutter means for cutting said tubing; said cutter means being operatively connected with said first sensing means so as to automatically cut said tubing upon said first signal from said first sensing means; said cutter means being disposed and adapted to cut at a predetermined location that automatically effects the correct length of tubing;
   f. heater means for heating said first end of said tubing to its softening temperature; said heater means bieng disposed in alignment with said first end of said tubing for receving said tubing and being connected with a source of energy for supplying the heat for heating said first end to its softening temperature;
   g. timer means connected with said heater means for controlling the time and duration of heating of said first end;
   h. guide pin means for being inserted within said first end of said tubing a predetermined distance for maintaining the internal diameter of said first end and any washer formed thereon; said guide pin means being carried by said structural framework and at least movable into alignment with said tubing before insertion;
   i. first insertion means for effecting relative longitudinal movement between said guide pin means and said tubing so as to effect insertion of said tubing over said guide pin means and said guide pin means within said tubing said predetermined distance;
   j. mold carried by said structural framework so as to be movable about said first end of said tubing to hold said tubing against longitudinal movement; said mold having a washer cavity to define the exterior dimensions and form of a shaped piece to serve as said washer; said mold being disposed such that said first end of said tubing extends into said mold cavity in operation;
   k. plunger disposed about said guide pin means and in alignment with said washer cavity so as to be able to compress and to fold in accordion fashion the walls of said first end longitudinally of said guide pin means and said cavity so as to form said washer;
   l. second insertion means for inserting said plunger within said washer cavity with sufficient force to compress and to fold accordion fashion said walls longitudinally of said guide pin means and said washer cavity and into conformance with the mold space between said guide pin means and the walls of said washer cavity to form said shaped piece;
   m. finalizing means for holding said plunger and guide pin means in their forward position for a predetermined length of time long enough to form said washer and adhere a film about and to the accordioned walls and thereafter:
      i. effect opening said mold;
      ii. effect retraction of said guide pin means; and
      iii. effect retraction of said plunger; so as to allow said tubing with said washer to fall free; said finalizing means being carried by said structural framework; and
   n. repeating and safety means for starting said feed means and repeating said cycle automatically responsive to the falling free of said tubing and washer and to prevent starting of another cycle and sound an alarm if said tubing and washer does not fall free.

2. The apparatus of claim 1 wherein said feed means comprises feeding pulleys engaging said tubing and a tray for carrying said first end of said tubing along a predetermined path for correct feeding thereof.

3. The apparatus of claim 1 wherein said grabber means includes a pair of jaws carried on respective pneumatically operated means to be moved to grip said tubing following said first signal from said first sensing means.

4. Apparatus of claim 1 wherein said first sensing means includes an air sensing switch that is activated when said tubing is correctly fed to block air flow.

5. The apparatus of claim 1 wherein said first insertion means includes a hydraulically operated ram that is movable between a plurality of positions; one position being a withdrawn position to allow the tubing and washer to fall free, and another position being a partially extended position for initially receiving said tubing over said pin means; and a third position being a fully extended position in full forward and supporting position just before said plunger is inserted within said washer cavity; wherein a limit switch is positioned to determine said fully extended position; said limit switch being outwardly connected with said second insertion means so as to effect operation of said second insertion means and insertion of said plunger within said washer cavity when said pin means is in said fully extended position.

6. The apparatus of claim 1 wherein said feed means includes a tray and alignment bar; said tray having an advancing means and a retracting means for forming a guide for feeding said tubing and allowing said tubing to be transferred downwardly; said grabber means comprises at least a pair of jaws to clamp said tubing and hold it after it has been cut so as to enable it to be moved downwardly and forwardly; said heater means comprises a multiple piece heating block that can be opened after a predetermined time interval to allow said tubing to be moved forwardly onto said guide pin means; a transfer control means is provided to effect transfer downwardly of said tubing after it has been cut so as to align its first end with said guide pin means; a restore means is provided for restoring said cutter means to its initial position following the cutting of said tubing; actuate means and release means are provided for said grabber means for releasing said tubing and allowing said grabber means to be tranferred backwardly and upwardly to its initial position for receiving tubing; said actuate means being responsively connected with said first sensing means and said release means being responsively connected with a special insert means; said special insert means being located to detect when said tubing has been inserted to the predetermined point to provide the requisite shaped piece formation within the washer cavity; said special insert means being connected to stop further insertion to said tubing insert means and to effect advancement of the guide pin means to its full forward position; said mold being formed in a plurality of pieces having open means and closed means; said closed means being connected with said special insert means so as to close said mold upon signal from said special insert means; said open means being connected with a second timer means so as to open said mold; said finalizing means comprises a second timer means that is connected with the open means to open said mold and with the retract means of both said guide pin means and said plunger; the respective means being interconnected such that when automatic operation is effected, there is automatically formed a shaped piece that will serve as a washer integrally with the walls of the thermoplastic tubing and automatically carry out the steps of inserting a pin means within the tubing so as to maintain a predetermined internal diameter within the tubing and the shaped piece formed thereon; emplacing the mold about the pin means and tubing to hold the tubing against longitudinal movement and compressing softened, heated tubing wall into the form of said shaped piece, said shaped piece extending back over the heating line and adjacent unsoftened conduit to prevent breaking at the line of heating and be dropped free to allow another washer and tubing wall to be formed integrally.

7. Apparatus for forming a washer integrally with walls of a thermoplastic tubing comprising:
 a. first means for inserting a pin means within the tubing so as to maintain a predetermined internal diameter within said tubing and a shaped piece type washer formed thereon;
 b. second means for emplacing a mold about said pin means and tubing to hold said tubing against said longitudinal movement; said mold having a washer cavity to define the exterior dimensions and form said shaped piece; said tubing extending about said pin means and into said washer cavity;
 c. heater means for heating at least a portion of and only a portion of the wall portion of the tubing that is within said washer cavity, the heating being sufficient to bring said portion of the wall to its softening temperature;
 d. piston means for compressing the softened walls of the tubing longitudinally of said pin means and folding said walls in accordion fashion back over a heating line and unsoftened conduit to prevent breaking at the line of heating and formed into a shaped piece the softened walls, said shaped piece having an exterior film having the acordioned walls therewithin to have an inherent springiness that readily effects sealing interconnection with another conduit shape and that frictionally holds a tightened fitting against loosening.

* * * * *